Dec. 3, 1929.  S. SNOWDY  1,737,898
KITCHEN UTENSIL
Filed Feb. 11, 1929  2 Sheets-Sheet 1
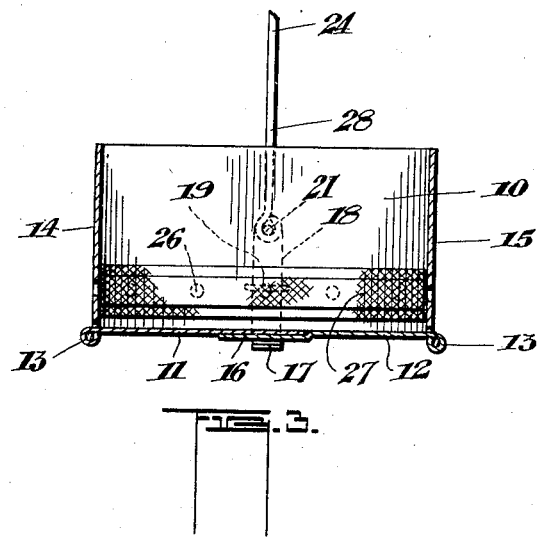
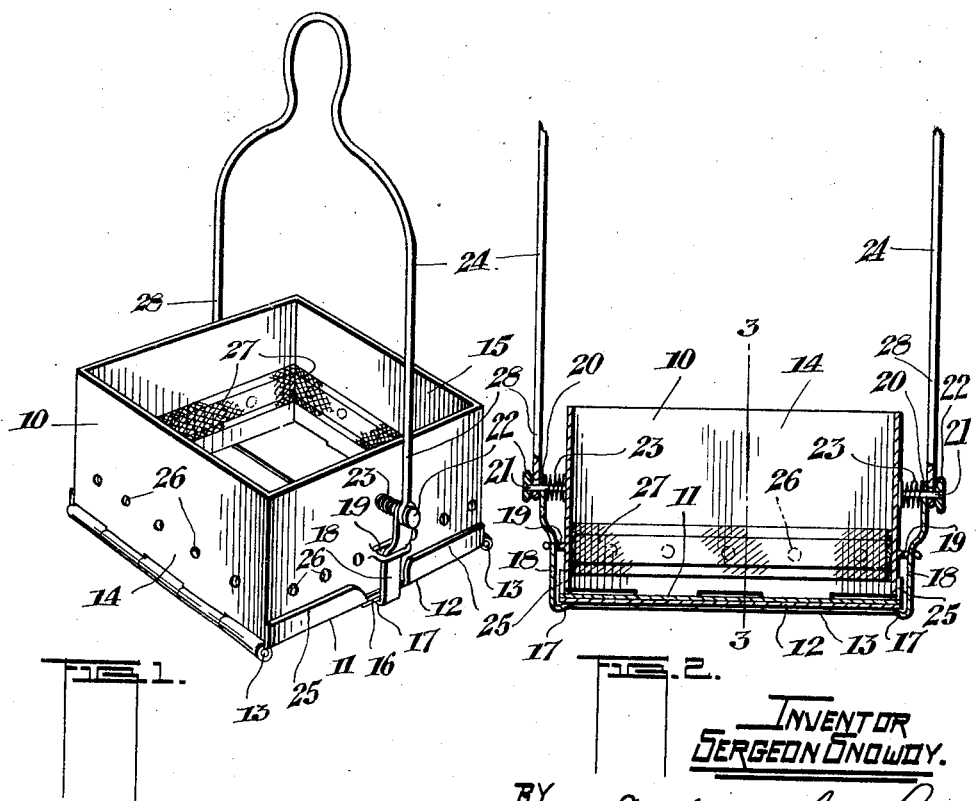
INVENTOR
SERGEON SNOWDY.
BY
ATTYS.

Dec. 3, 1929. S. SNOWDY 1,737,898
KITCHEN UTENSIL
Filed Feb. 11, 1929 2 Sheets-Sheet 2
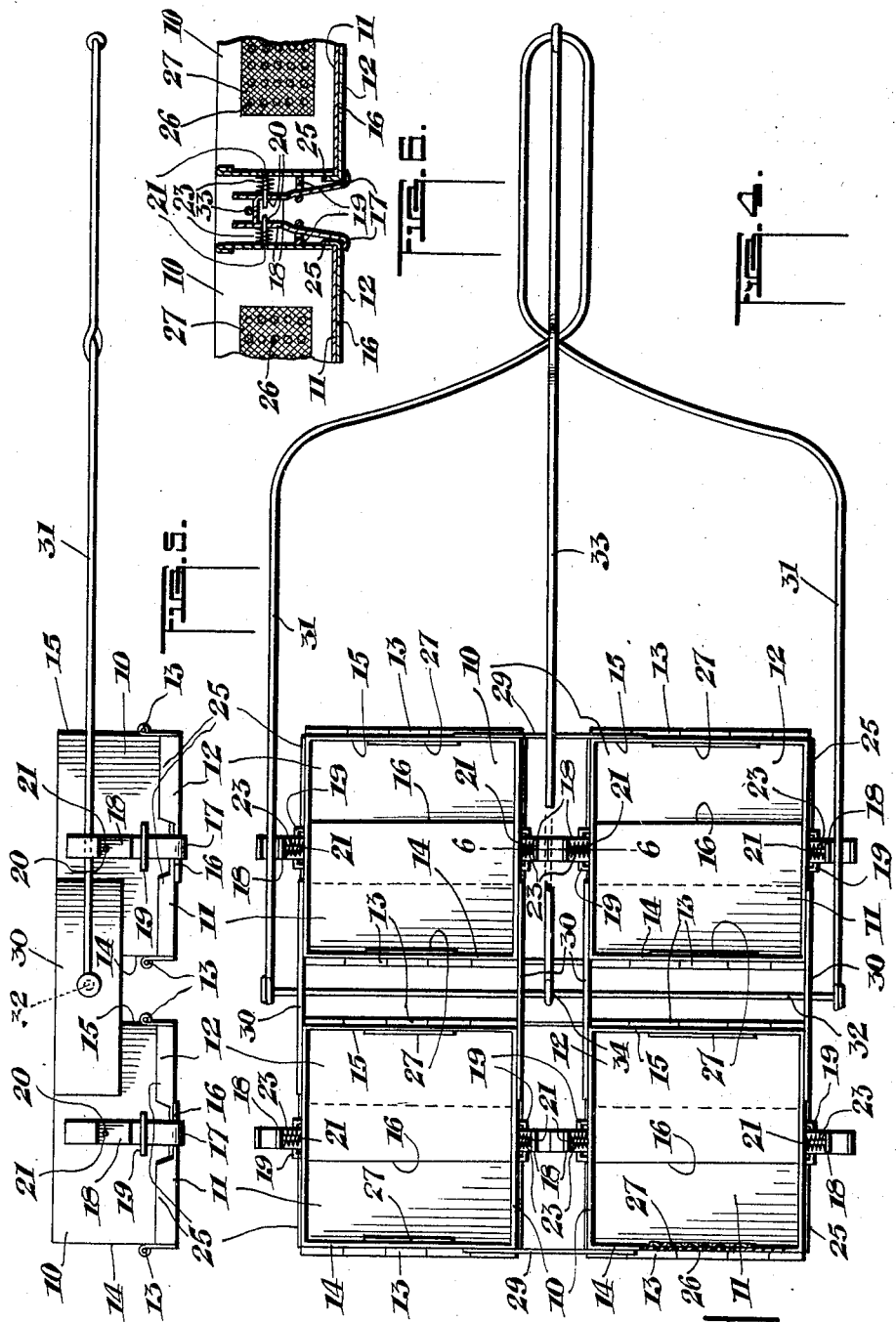
INVENTOR
SERGEON SNOWDY
BY
ATTYS.

Patented Dec. 3, 1929

1,737,898

UNITED STATES PATENT OFFICE

SERGEON SNOWDY, OF NORTH BAY, ONTARIO, CANADA

KITCHEN UTENSIL

Application filed February 11, 1929, Serial No. 339,153, and in Canada July 30, 1928.

This invention relates to improvements in kitchen utensils and more particularly to improvements in egg poachers and the objects of the invention are to provide a cooking utensil of this description in which an egg will be effectively and more satisfactorily poached and served without being broken and also free from moisture.

A second object is to provide a handy device of this kind that can be bought in quantities at very low cost.

With these and other objects hereinafter more fully referred to, the invention consists in the novel construction, combination and arrangement of parts disclosed in the present specification and illustrated in the accompanying drawings which form part of the same.

Referring now to the drawings in which like characters of reference indicate corresponding parts in each figure and in which a preferred example of the invention is disclosed, Figure 1 is a perspective view of the utensil as a whole.

Figure 2 is a cross-section of Figure 1.

Figure 3 is a sectional view on the line 3—3 of Figure 2.

Figure 4 is a plan view of the utensil in assembled battery form.

Figure 5 is a side view of the same.

Figure 6 is a section on the line 6—6 of Figure 4.

Referring more particularly to the drawings, 10 designates a substantially rectangular casing of any suitable material used for cooking utensils, such as aluminum. This casing is open at the top and the bottom is formed of a pair of sections 11 and 12 hingedly connected as at 13 to each of the side walls 14 and 15 of the casing and adapted in closed position to overlap as at 16.

These sections 11 and 12 are normally retained in closed overlapping position by the bent ends 17 of catch members 18 movable in guideways 19 on the side walls of the casing and connected through orifices 20 in the upper ends of the catch members 18 by pins 21 projecting from opposite side walls of the casing. These pins are provided on the outside with caps or heads 22 and between the catches 18 and the side walls of the casing have wound thereon coil springs 23 whereby the catches are spring-held in engaging position with the sections 11 and 12 forming the bottom of the casing.

Suspended and swingingly mounted on the pins 21 between the catch members 18 and the heads 22 thereof is a combined handle and suspension member 24 consisting of a single strip of wire forked and formed on its extremities with loops to engage with the pins 21, the intermediate portion forming a looped handle.

Another feature of the hinged overlapping sections 11 and 12 forming the bottom of the casing is that the edges forming part of the side walls are flanged as at 25 to prevent an egg when broken into the casing from seeping therethrough, while at the same time permitting water to enter the casing. I also provide in the sides of the casing a plurality of spaced holes 26 for draining off the water when the device is lifted, the sides of the casing containing the holes being provided with a netting 27 to prevent any portion of the egg passing through the holes with the water.

Normally, as previously mentioned, the spring-held catches 18 retain, as shown in Figure 1, the overlapping sections 11 and 12 forming the bottom of the casing in closed position. The device in this state is placed in a pan or other suitable cooking utensil with water in it when the water will immediately seep through between the bottom sections and the walls. The egg to be poached is then broken into the casing and when it is cooked the device with the cooked egg is lifted from the pan, the water immediately draining out through the holes 26 and also seeping out between the bottom sections 11 and 12 and the sides. The device is now held over a plate or the like on which the egg is to be served and the side arms 28 of the handle are pressed thereby exerting inward pressure on the ends of the catch members 18 moving the bottom portions thereof outwardly and disengaging them from the hinged sections 11 and 12 which automatically drop open allowing the egg to be carefully and satisfactorily deposited on the plate ready for serving.

To avoid danger of breaking the egg, the device can be held quite close to the plate and then gradually moved upwardly away from it, thus permitting the egg to slide onto the plate instead of being dropped on.

In Figures 4 and 5 a plurality of the utensils are shown in battery form consisting of two pairs connected to one another in any suitable manner by the plates 29 and 30. The common handle 31 is similar to the handle 24 and is pivotally connected at each end to a cross-bar 32 extending transversely between the pairs of utensils and protruding beyond the plates 30. The handle is also provided with a reinforcing centrally arranged rod 33 pivotally connected to the cross-bar 32 at 34, the other end being rigidly connected to the handle 31.

In operation the handle 31 is adapted in one position when squeezed with the rod 33 to open one of the utensils, the other three remaining closed. On this operation being repeated a second utensil is opened, one pair being thus opened the other pair remaining closed. To individually operate the other pair the handle as a whole is swung on the rod 32 to the opposite position to that disclosed in Figure 4 and the operation as above described is repeated.

It will be noted that the invention in any of the forms disclosed can be used most successfully for boiling eggs as well as poaching them.

As many changes could be made in the above construction and many apparently widely different embodiments of my invention, within the scope of the claims, constructed without departing from the spirit or scope thereof, it is intended that all matter contained in the accompanying specification and drawings shall be interpreted as illustrative and not in a limiting sense.

What I claim as my invention is:—

1. A cooking utensil comprising a casing open at the top and provided with a hingedly mounted closure member for the bottom, spring-pressed catch members supported on the casing and adapted to normally engage with and retain the closure member closed, a combined handle and suspending member for the casing operatively associated with said catches whereby, on the handle member being pressed, the catch members are released to permit the bottom to open.

2. A kitchen utensil for poaching eggs and the like comprising a casing provided with hingedly mounted overlapping sections to form a closure member for the bottom, catches loosely supported on the casing and adapted to normally engage with and retain the bottom sections closed, a handle associated with said catches loosely connected to the casing, designed under the influence of pressure to operate the catches to automatically release the bottom sections and permit the contents of the casing to be gradually deposited therefrom.

3. In a device of the character described, the combination with a casing open at the top and provided with a pair of hinged sections forming the bottom, of catch members supported on the casing and spring-held to normally engage with and retain the bottom sections closed, a combined handle and suspending member connected to the casing and co-operating with the catch members whereby, on the handle being pressed, the catch members are operated to release and permit the bottom sections to open to deposit the contents of the casing.

4. The device as claimed in claim 3 in which a plurality of spaced orifices are provided substantially midway in each side of the casing for drainage purposes.

5. The invention according to claim 3 in which the bottom of the casing is formed with flanges to engage with the side walls of the casing and prevent leakage of the contents of the casing while permitting the entry and discharge of water therefrom.

6. In an egg poacher, the combination with a casing provided with a hingedly mounted bottom, and catch members carried by the casing and normally engaging with and holding the bottom closed, of a handle for the casing co-operating with the catch members to impart pressure exerted thereon to said members to disengage the catch members and permit the bottom to open.

In witness whereof I have hereunto set my hand.

SERGEON SNOWDY.